(No Model.)
W. E. GIBBS.
VALVE FOR PNEUMATIC TIRES.
No. 485,540.                     Patented Nov. 1, 1892.
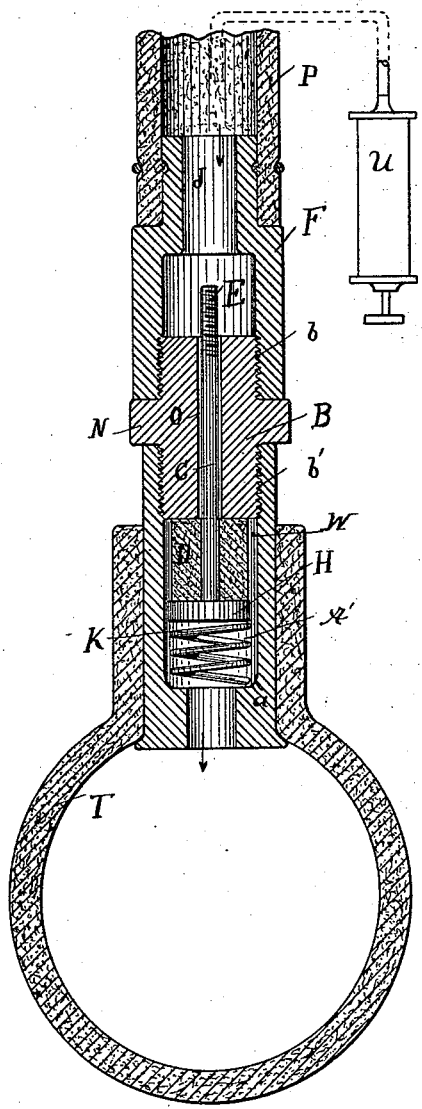
Fig. I.
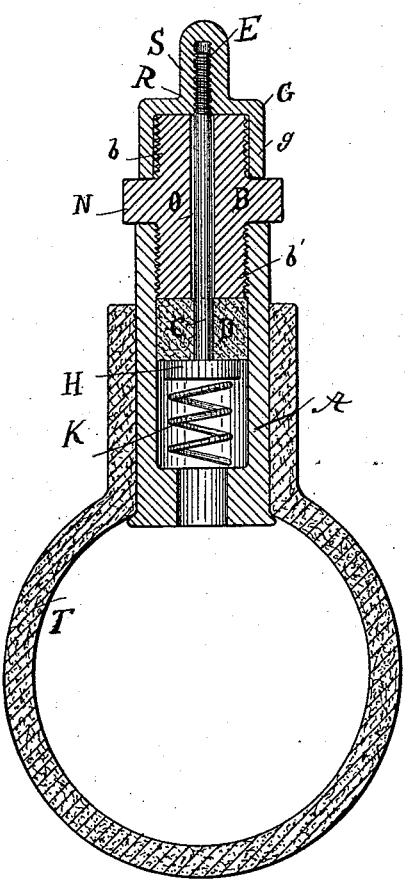
Fig. II
Witnesses
M. E. Bidgood
S. E. Martin
Inventor
William E. Gibbs
per Knight Bros
attys

UNITED STATES PATENT OFFICE.

WILLIAM E. GIBBS, OF NEW YORK, N. Y.

VALVE FOR PNEUMATIC TIRES.

SPECIFICATION forming part of Letters Patent No. 485,540, dated November 1, 1892.

Application filed May 3, 1892. Serial No. 431,713. (No model.)

*To all whom it may concern:*

Be it known that I, WILLIAM E. GIBBS, a citizen of the United States, residing in the city, county, and State of New York, have invented certain new and useful Improvements in Valves, of which the following is a specification.

My invention, although relating to an improved construction of valves, is specifically devised to be utilized in connection with hollow rubber tires, or what is known as "pneumatic" tires, for bicycles. In the inflation of these hollow tires it is necessary to provide means for securing a suitable cut-off or valve for the back-pressure of the atmospheric air and in connection therewith to secure a permanent shut-off for the preventing of leakages during service. In these valves as hitherto constructed it has been found difficult to make them retain the air within the hollow tire, a gradual leakage taking place, which necessitates frequent inflations of the tire. This leakage is due partly to the dust on the rubber of the tire getting between the valve and its seat, causing thereby an imperfect closure, and partly to the ordinary leakage through the metallic joints. My invention aims to overcome these difficulties and to provide an air-tight valve which shall be effectual against dust, leakage, and corrosion and which shall not be loosened by the continual vibration and jar to which such valves are subjected.

Referring to the accompanying drawings, which form a part of this specification, Figure I represents a cross-section of a pneumatic tire with my improved valve attached. In this figure I show a temporary cap, illustrating the method of filling the tire with compressed air. Fig. II is a vertical section of my improved valve with the permanent cap in place, the temporary cap having been removed.

In Fig. I, A represents a tube, of metal, vulcanite, celluloid, or other substance not easily corroded by india-rubber or the materials contained in it, having an internal shoulder $a$ inserted, as shown in Fig. I, in the hollow tire T.

B is a plug having a screw-thread $b\ b'$ at its ends. It is further provided with a centrally-located enlarged portion N, which may be constructed in the form of a nut, or it may be milled on its periphery, so that it may be utilized for screwing the plug B into the tube A by hand. It is further provided with a centrally-located conduit or opening O, bored axially, as shown.

At C is a spindle somewhat smaller in cross-section than the opening O of the plug B. This spindle is provided with a screw-thread E at its outer end and an enlarged head or button H at its inner end.

D is a tubular piece or collar of soft rubber, cork, or other elastic and yielding material and fitting closely as a sleeve on the spindle C, its inner end abutting against the head or button H. The tubular collar D is inserted in the tube A, with an annular space $w$ between the collar and tube.

F is a removable temporary coupling provided with a screw-thread adapted to screw on the thread $b$ of the plug B and to be employed during the process of pumping air into the hollow tire. The coupling is hollow and is provided with an interior chamber J and is adapted to receive a pipe P, leading from the air-pump. When filling the hollow tire with air for the purpose of distending it, the temporary cap F is screwed onto the plug B, as shown, and air from the pump is forced into the chamber J, and thence passes down through the conduit or port O of the plug B. At the end of this conduit it reaches the rubber valve D, and the pressure being sufficient to force the valve inwardly the air will enter the chamber A' of the tube A, and from thence pass into the hollow tire T. The air is prevented from returning by the immediate closure of the rubber valve on its seat upon the inner end of the plug B.

The required internal pressure in the pneumatic tire having been obtained, the pump U is disconnected by unscrewing the coupling F on the plug B. The valve is then ready for the reception of its permanent cap. This permanent cap is shown at G in Fig. II, and consists of a skirt $g$, having a smooth interior surface, an annular rim or flange R, and stem S. Stem S is hollow and is threaded on its interior surface and is adapted to screw upon the screw-threaded portion E at the upper end of the spindle C.

When the temporary cap F, as aforesaid, has been removed and the permanent cap G is applied, it will be seen that by screwing it on the spindle and over the nut B the said spindle will be drawn up through the port O of the plug B, thereby compressing the rubber valve or thimble D longitudinally and between the button H and the valve-seat, thus causing the said sleeve-like valve (being formed of rubber, as aforesaid) to extend laterally until it fills the entire space $w$ between the interior walls of the tube A, the button H, and the valve-seat on the plug B, providing thereby an air-tight plug. The parts are shown in this position in Fig. II.

As before stated, one of the difficulties heretofore unsatisfactorily contended with in respect to valves upon pneumatic tires has been the fact that the dust which sheds from the interior surface of the rubber tire has crept in between the valve and its seat, thereby causing an uneven positioning of the valve, allowing leakages of air. It will be seen from the above description and the drawings that any small particles of dust or grit which may have entered the valve will by the pressure be embedded in the rubber. This important drawback is therefore removed in this manner.

In addition to the above parts I have provided a coiled spring K, which will upon removal of interior atmospheric pressure keep the valve against its seating.

The skirt $g$ of the permanent cap G fits down and over the screw-threaded portion $b$ of the plug B and serves as a guard therefor, preventing abrasion or breakage of the screw-thread.

In case of accident to the valve or rubber sleeve all the working parts may be removed by loosening the screw-cap G and unscrewing the plug B at $b'$.

It will be seen that the valve when expanded, as shown in Fig. II, constitutes a complete check to the escape of air and forms a cut-off, which lies nearer the tire than any joint, and as a consequence no great care is required in making these joints especially perfect or tight.

Having thus described my invention, the following is what I claim as new therein and desire to secure by Letters Patent:

1. The combination of a hollow tire or other chamber adapted for the reception of compressed air with a combined valve and plug provided with an elastic packing or gland adapted to operate as a valve during the filling of the chamber and as a plug when permanently compressed longitudinally and expanded laterally, substantially as shown and described.

2. In a combined valve and plug, the combination of a tube A, a tubular collar D, of yielding material, inserted in the tube A, whereby a space is formed between the said tubular collar and tube A, so that the parts will operate as a valve, and means, substantially as shown and described, for transforming the valve into a plug by compressing the collar D longitudinally and expanding it laterally, so as to fill the space between it and the tube A, as set forth.

WILLIAM E. GIBBS.

Witnesses:
HERBERT KNIGHT,
M. V. BIDGOOD.